R. C. Mitchell

R. C. MITCHELL.
LOW LEVEL OIL SIGNAL FOR AUTOMOBILES.
APPLICATION FILED AUG. 31, 1917.
1,364,295.
Patented Jan. 4, 1921.
2 SHEETS—SHEET 2.
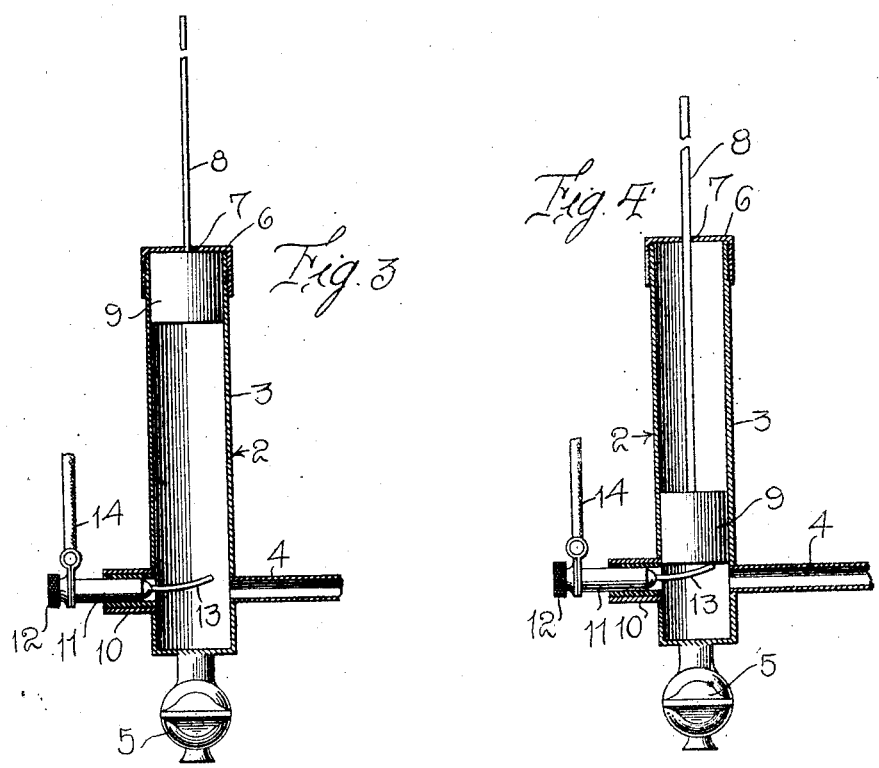
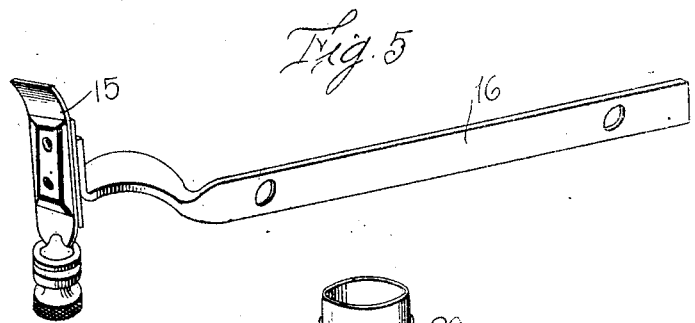
Inventor
R. C. Mitchell

UNITED STATES PATENT OFFICE.

REUBEN C. MITCHELL, OF HARRISBURG, ILLINOIS.

LOW-LEVEL OIL-SIGNAL FOR AUTOMOBILES.

1,364,295.  Specification of Letters Patent.  Patented Jan. 4, 1921.

Application filed August 31, 1917. Serial No. 189,110.

*To all whom it may concern:*

Be it known that I, REUBEN C. MITCHELL, a citizen of the United States, residing at Harrisburg, in the county of Saline and State of Illinois, have invented certain new and useful Improvements in Low-Level Oil-Signals for Automobiles, of which the following is a specification.

This invention relates to a low level oil signal for automobiles.

The primary object of this invention is to provide a device which may be attached to the oil base of an automobile and indicate by a signal or alarm, as a horn, when the oil reaches a low enough stage to need replenishing, in order that the bearings will not be burned out through lack of oil.

With the foregoing and other objects in view that will appear as the nature of the invention is better understood, the same consists in the novel features of construction, combination and arrangement of parts illustrated in the drawings and more particularly pointed out in the appended claim.

In the accompanying drawings in which like parts are designated by like characters throughout the several views:—

Fig. 3 is a sectional view of the oil gage or tube and associated parts, showing the position of the float when the oil base is full.

Fig. 4 is a similar view, showing the position of the gage when the oil in the oil base reaches a low enough level to need replenishing.

Fig. 5 is a detail perspective view of a contact support, forming a part of the device and Fig. 6 is a detail perspective view of the lever connection.

Figure 1:
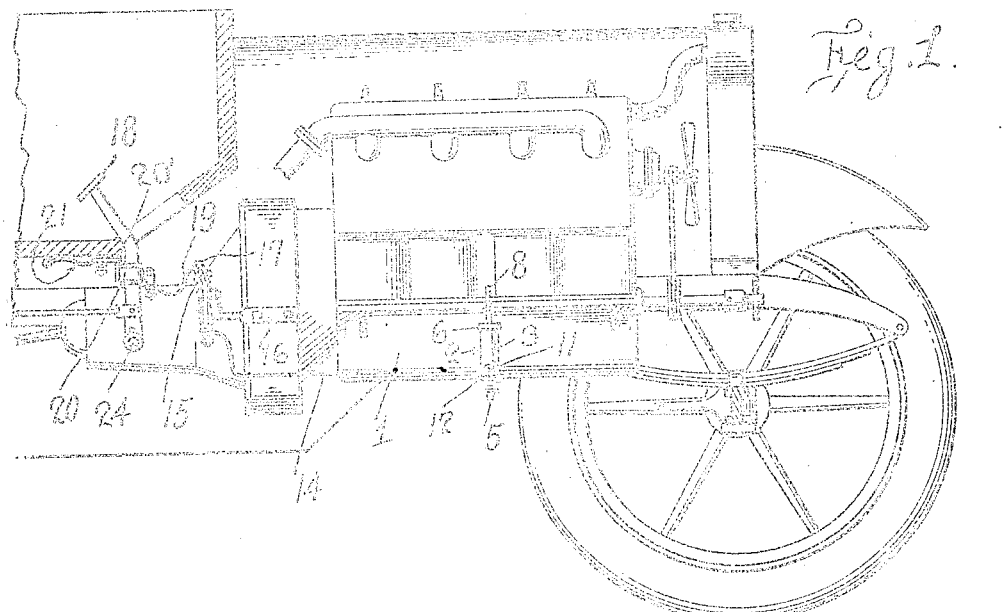
Figure 1 is a sectional side elevation, illustrating the application of the invention to an automobile.
Figure 2:
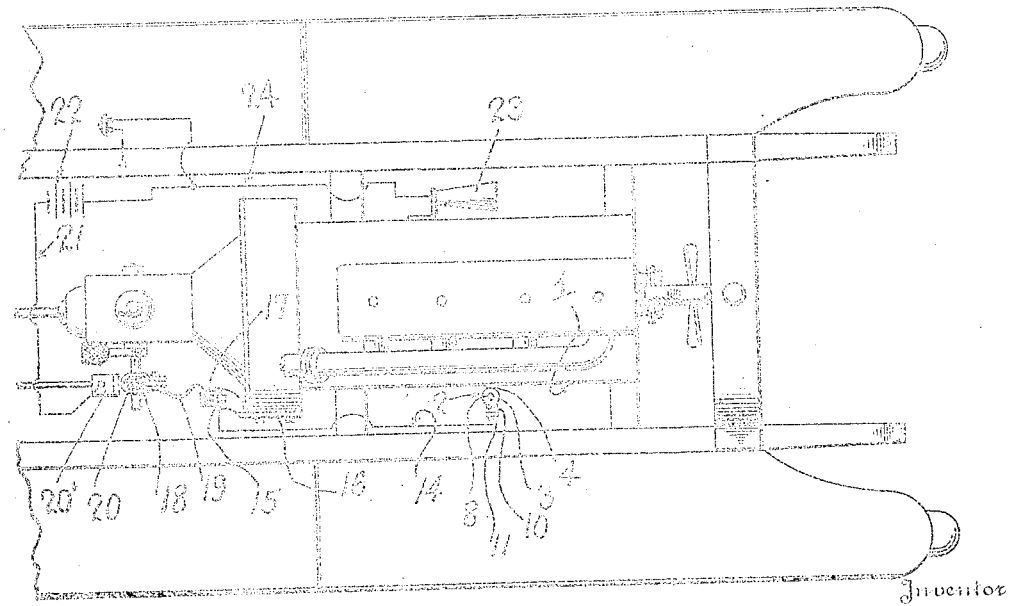
Fig. 2 is a plan view thereof.

Referring to the drawings for a more particular description of the invention and which drawings are for illustrative purposes only and are therefore not drawn to scale, 1 indicates the oil base of an automobile and 2 the oil signal. The latter, as shown, comprises a cylindrical oil tube 3, which is supported in a vertical position at one side of the machine and connected at its lower end with the oil base by the horizontal pipe 4. The oil tube or cylinder 3 is provided at its lower end with a drain cock 5 of any suitable form and is closed at its upper end by the screw threaded cap 6 provided with a central aperture 7 to receive the stem 8 of the metal float 9 working in said tube or cylinder.

The oil tube or cylinder 3 is provided at its lower end, directly opposite the pipe 4, with the insulated tube 10, of brass or other suitable material, adapted to receive the cylindrical body 11 of the contact 12, the upwardly bent stem, as 13, of which, extends well within the lower end of the oil tube 3 and is adapted to be engaged by the bottom of the float 9 when the supply of oil in the oil base of the machine reaches a low enough level to require replenishing.

The contact 12 is connected by the insulated conductor 14 with the flat rectangular oblong contact plate 15, secured to the rear end of the horizontal longitudinally disposed arm or bracket 16 bolted or otherwise attached to the machine frame. A bifurcated contact 17 straddles the upper end of the contact plate 15 and is connected with the foot brake 18 through the medium of the flexible conductor and insulated clamp 19 and 20, respectively. A third conductor 21 extends from the depending bracket 20' against which the clamp 20 normally rests to the battery 22 which is suitably supported on the machine.

The numeral 23 designates the signal horn which is connected to the battery 22 by the conductor 24 and blows when the oil in the oil base reaches a low enough level to need replenishing and continues to operate until the oil is replenished. However, when the foot brake 18 is in use, the clamp 20 is disengaged from the depending bracket 20' as will be obvious when the circuit will be broken, even though the float is in engagement with the stem 13 of the contact 11 as shown in Fig. 4.

The purpose of giving an alarm or signal when the oil in the oil base reaches a low enough level to require replenishing is to prevent the bearings from being burned out through lack of oil. Means are provided for breaking the circuit when the foot brake is in use for the reason that in some machines, in going down hill, the oil might flow to the front end of the oil base and cause the horn to blow at a time when there was still a sufficient amount of oil to operate on for some time.

From the foregoing description, taken in connection with the drawings, it is thought that the construction, operation and advantages of this invention will be readily understood without requiring a more extended explanation.

Various changes in the form, proportions and minor details of construction may be resorted to without departing from the principles or sacrificing any of the advantages of this invention as defined in the appended claim.

Having described my invention, what I claim as new and desire to secure by Letters Patent is:—

A low-level oil signal for automobiles comprising an audible signal, a source of electrical energy, a vertically disposed oil tube or cylinder communicating with the oil base of the machine, a float valve working in said tube or cylinder, electrical connections including a contact extending into the lower end of the oil tube for establishing an electric circuit through the signal to operate the same when the float descends to a sufficient extent to engage said contact, a foot brake and a movable contact connected with said foot brake for breaking the circuit when the foot brake is in use.

In testimony whereof I affix my signature in the presence of two witnesses.

REUBEN C. MITCHELL.

Witnesses:
JACOB W. MYERS,
A. E. SOMERS.